May 2, 1967  A. D. CARTWRIGHT, JR  3,316,675
PLANT CONTAINER

Filed Aug. 5, 1965  2 Sheets-Sheet 1

INVENTOR
ALBERT DAVID CARTWRIGHT, JR.
BY Mason, Mason and Albright
ATTORNEYS

May 2, 1967  A. D. CARTWRIGHT, JR  3,316,675
PLANT CONTAINER

Filed Aug. 5, 1965  2 Sheets-Sheet 2

INVENTOR
ALBERT DAVID CARTWRIGHT, JR.

BY Mason, Mason and Albright
ATTORNEYS

United States Patent Office 3,316,675
Patented May 2, 1967

3,316,675
PLANT CONTAINER
Albert David Cartwright, Jr., Collierville, Tenn. 38017
Filed Aug. 5, 1965, Ser. No. 477,525
5 Claims. (Cl. 47—37)

This invention relates to an improved container for and/or method of packaging a plant having a root system confined in a ball of earth. The container of the present invention is designed to maintain the plant, its roots and the ball of earth in their original integrated coherence during transportation and handling and while on merchandising display, thus assuring longer shelf life and lessening the mortality rate of such plants between their excavation and their transplanting.

The preservation of the cohesive continuity or integrity of the roots of the plant in a ball of earth, preserving the moisture content about the root system of the plant, remains a very perplexing problem to nurserymen engaged in the wholesale distribution of their plant stock, as well as to the merchants who display and sell the plants, despite previously known efforts and proposals to solve the problem.

Drum-type bindings, of rope or twine applied exteriorly of a burlap wrapping about an earthen-ball of plants, have been used for many years. Such binding requires a dexterity and expertness which few common laborers can master. Also, this prior art method is expensive in terms of time consumed to effect proper wrapping and it affords little moisture protection to the ball of earth.

A further disadvantage is that such wrapping is inherently weak so that the plant can only be handled by supporting and carefully lifting same at the bottom of the ball of earth. Hence, the use of this type of wrapping is usually restricted to large and expensive trees where the time lags between excavation and transplanting is a matter of days and where cost is no objection.

Other prior proposals have been in the nature of cloth-textile bandages in various forms, which are wrapped about the girth of the ball of earth and drawn tight to be held in place by lacing extending through eyelets or hems. Other devices have been fashioned of cloth in bag-forms, some of which are equipped with drawstrings. Still other proposals have been to wrap the ball of earth with a woven reticulated cloth of wire-mesh as well as to provide a rigid wire basket of open framework fashioned from spaced strands of wire. None of these measures protect the plant or prevent the disintegration of the ball of earth from the root system of the plant during handling, shipment or display. Also, such prior art measures do not preserve the moisture content of the earth or prevent the disintegration of the ball of earth should the plant be lifted or rocked from side to side by its stem or trunk during transport or handling.

As a consequence of the deficiencies of the prior art, there remains a long-felt need, especially among wholesale nurserymen, for a relatively cheap and simple wrapping for plant stock, each having its roots in a ball of earth—of say, from about 6 to about 24 inches in diameter or larger, that will be economical enough for use in lots of 10,000 to 1,000,000 per season, that will not be affected by moisture or weather conditions, that can be properly applied by the most inexperienced persons, that will impart the rigidity required to hold the ball of earth in its originally excavated shape or condition and prevent the ball from "pancaking" (i.e., disintegrating and flattening) during handling, transportation or when the plant is lifted by its stem and placed on a supporting surface, that will prevent sifting or excretion of the soil or mud from the ball, that will serve as a means of controlling the moisture content of the ball and that will yet form a more attractive display package for plant stock.

The object of this invention is to provide a wrapper for the ball of earth and its associated plant stock that will have all of the advantages enumerated in the preceding paragraph and which is constructed of relatively inexpensive materials and in a manner that renders the wrapping economically feasible to wholesale nurserymen by the ease with which it is applied. The container of the present invention has the added advantages of neatness and attractiveness of appearance.

In the drawings, which form a part of this specification, the invention is illustrated, by way of example, in its preferred construction and arrangement of parts as now devised.

Figure 1:
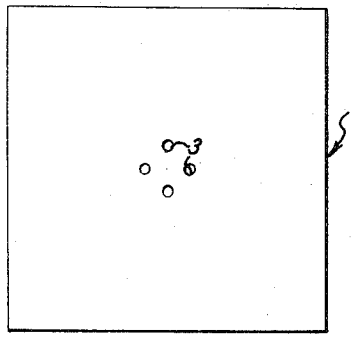
FIG. 1 shows in plan view a flexible cover which forms the inner lining of the container.

Referring in detail to the drawings, the cover 2 of FIG. 1 can be rectangular, square or otherwise dimensioned to fit the frame 4 and, preferably, overlap same. The cover 2, which forms the inner lining of the container, is of flexible material such as burlap or it can be a flexible plastic sheet or net of polyethylene, polypropylene, polyester or the like of about 2–8 mils in thickness. Cover 2 can have one or more drain holes 3.

Figure 2:
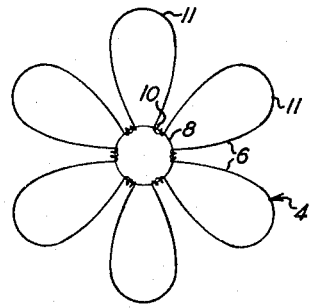
FIG. 2 shows in plan view a typical frame for the container of connected strand members.

The frame 4 illustrated in FIG. 2 is comprised of loop strand members 6 connected radially to a generally circular strand selvage base member 8. If the strands 6 and 8 of the frame are wire, the loop members can be simply connected by twisting the strands about the selvage strand as indicated at 10. As an example, the loop members can be made of 18-gauge soft maleable tie wire having a tensile strength of about 156 lbs. The selvage strand base member can be made of 16-gauge soft maleable tie wire having a tensile strength of about 212 lbs. The cover is conveniently polyethylene of any standard density having a thickness of about 4 mils. However, I have used fiber cord and nylon for the strand members simply tying them together instead of twisting them together as is done in the instance of the wire strands illustrated herein. The type of material used and the strength characteristics, of course, will depend on the size of the plant to be wrapped.

The loop members 6 and the selvage member 8 are preferably both wire strands which are continuous or made from a single strand of wire. The loop members have loop portions 11 that are rounded so that the loop members can be distorted and stretched to conform to the dimensions of the plant being packaged. The selvage member 8 is generally of round or circular configuration so that a base is formed. It will be appreciated, however, that the selvage member can be polygonal so long as it is a generally circular, endless member.

Figure 3:
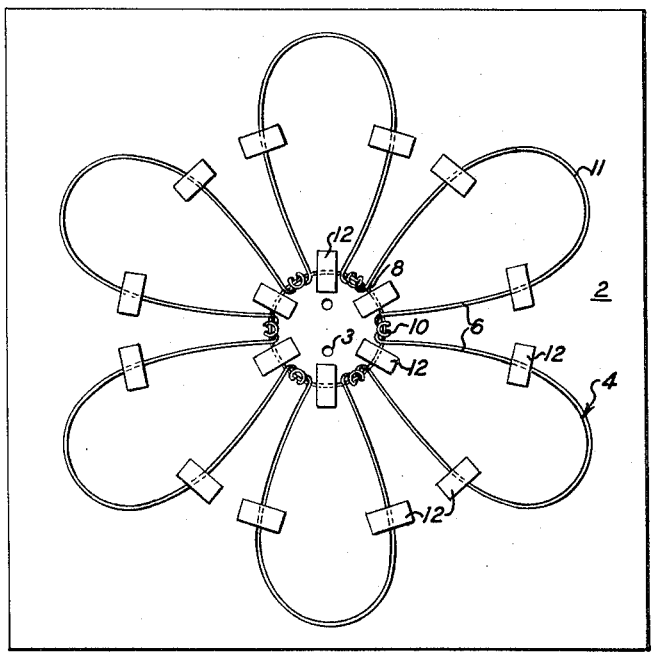
FIG. 3 is a plan view of the underside of the assembled container.
Figure 4:
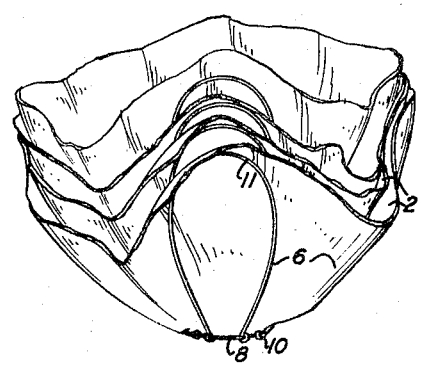
FIG. 4 is a side elevation of a plurality of assembled containers in a nested arrangement.

FIG. 3 shows the frame 4 attached to the cover 2 by means of adhesive tapes 12 although other ways of securing the frames and covers together will suggest themselves. As shown in FIG. 3, the container is substantially flat. In FIG. 4 a group of nested containers are shown in which the selvage base member 8 of each container is horizontally disposed while the loop members 6 are inclined upright to form a bowl-shaped container with the cover or line 2 being folded to conform within the frame.

Figure 5:
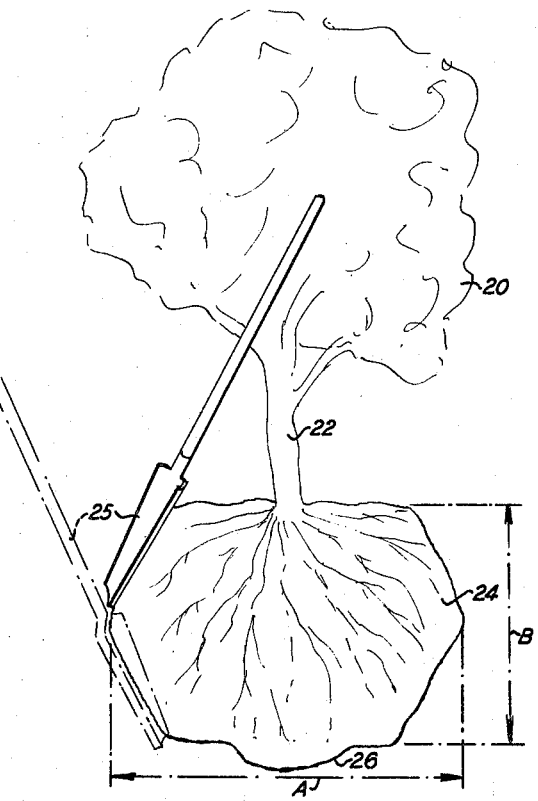
FIG. 5 is a side elevation of a plant being excavated so that its root system is preserved in a ball of earth.
Figure 6:
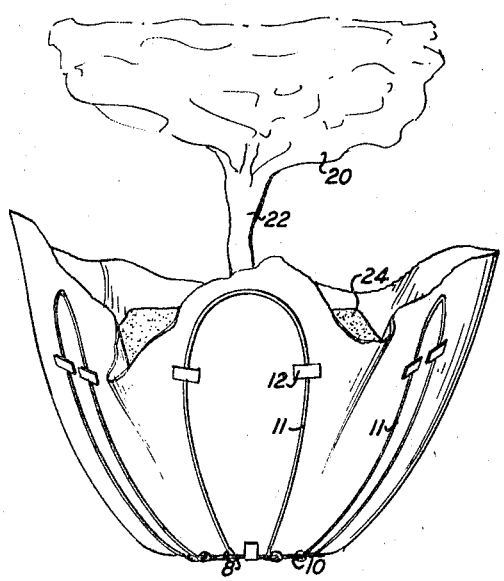
FIG. 6 is a side elevation of the plant of FIG. 5 being packaged in a container of the instant invention.
Figure 7:
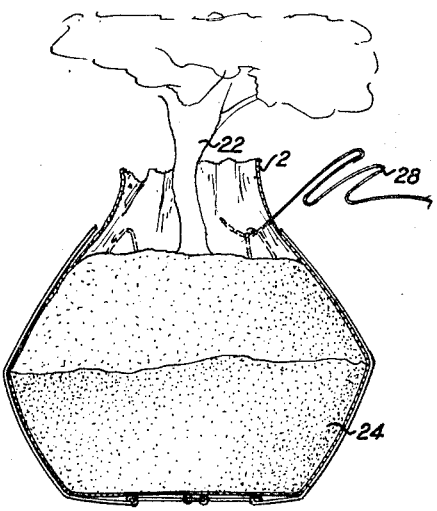
FIG. 7 is a side elevation of the plant of FIGS. 5 and 6 being tied in the container.
Figure 8:
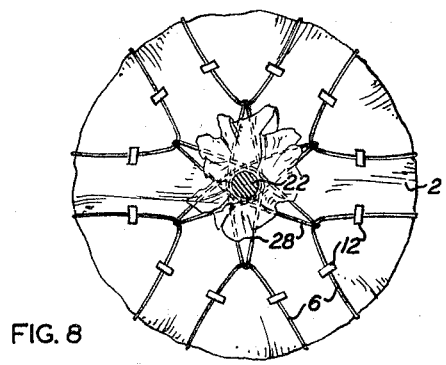
FIG. 8 is a top plan view of the plant of FIGS. 5–7 with part of the stem broken away showing the container tied so that the plant can be handled and transported.

FIGS. 5-8 illustrate a plant 20 with stem 22 and root system integral with the ball of earth 24 being removed with the aid of spades 25. In the instance of larger plants, the soil can be left intact or integral with the ground at 26. At this stage, it is desirable to wrap and bind the major portion of the ball 24 which has been severed or separated from the ground. Using a base selvage member with as small a diameter as possible to encircle the unsevered part 26, the loops and cover are wrapped around after the ends of the selvage member are connected to form a circular base. Obviously, in this application the cover is wrapped around the ball of earth leaving the part 26 uncovered. Then the loops and cover are pulled up as seen in FIG. 6 and the apexes of the loop portions are tightly laced by a tie 28 as shown in FIG. 7 so that the stem is connected to the loop portions with the tie 28 as shown in FIG. 8. The plant can then be tipped and part 26 completely severed. The cover can be slipped under the part 26 before the loop portions are tightly laced.

Unless the plant is large, it will not be necessary to use another cover for part 26. In the instance of shrubs and small trees, the entire plant, together with ball of earth 24, can be completely excavated and a container, such as shown in FIG. 2 or 3, slipped under the ball of earth with the cover and loop members being laced tight as shown in FIGS. 6-8. It will be noted that in all instances the plant is packaged so that the cover extends above the apexes of loop portions 11 to protect the stem 22 and the stem is tightly secured to the loop portions by lacing tie 28 through the loop portions and around the stem of the plant. With this arrangement, the integrity of the root system and the ball of earth will not be destroyed even if the plant is handled by its stem.

Figure 9:
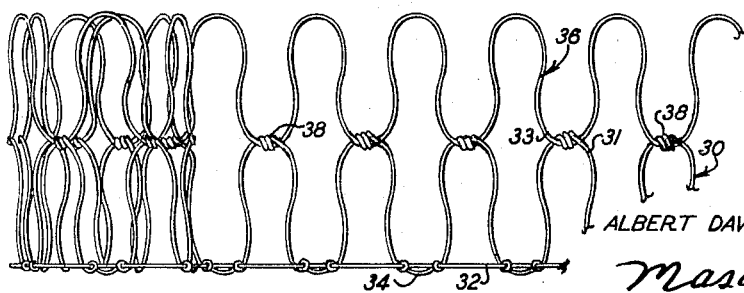
FIG. 9 is a side elevation with parts broken away of a length of strands which can be cut into individual frames for containers.

It will thus be seen that the form of the container is distortable and will closely conform to the general configuration of the ball of earth to tightly bind same in the cover or liner when the loops are laced to one another and to the stem of the plant. Also, the base selvage member serves to anchor the loop members and evenly distribute the strain and tension on the strands. It will be appreciated that should an extension of the loop members be desired, it is only necessary to interlace a second series of loops as shown in FIGURE 9.

It has been found that the size of the diameter of the plant's stem can be used as a criteria to roughly determine the horizontal and vertical dimensions of the ball of earth and, consequently, the size of container to be used. For instance, the horizontal dimensions A and the vertical dimensions B of FIG. 5 are as follows:

| Stem Diameter (One Foot Above the Ground), Inches | Horizontal Dimension (A) of the Earthen Ball, Inches | Vertical Dimension (B) of the Earthen Ball, Inches |
| --- | --- | --- |
| ¾-1 | 12 | 9 |
| 1-1¼ | 14 | 12 |
| 1¼-1½ | 15 | 12 |
| 1½-2 | 20 | 12 |
| 2-2½ | 24 | 12 |
| 2½-3 | 27 | 13 |
| 3-3½ | 30 | 14 |
| 3½-4 | 34 | 15 |

In sizes above those listed in the above chart, the rule of thumb of one inch in diameter of the tree requiring one foot of ball in diameter would apply. For instance, a tree six inches in diameter would normally have about a six-foot wide ball and the vertical dimension would be on the order of thirty to thirty-six inches, depending on the variety of tree and the conditions under which it was grown.

It is the best arrangement to attach loop members approximately every four inches along the selvage strand member. Thus, a container having five loop members will have a base selvage member with a circumference of about twenty inches and for every increment of loop member the circumference of the selvage member will be increased four inches. It then follows that for each loop member increment the diameter of the selvage base member increases about an inch or so and, consequently, the vertical dimensions of the container as a whole are increased by about the same amount. By selecting a container having the appropriate number of loop members, it is possible to obtain a wide selection of container sizes depending on the size of the plant being packaged. The preferred arrangement is to standardize the number of loop members for a given length of selvage strand member but it will be understood that in one modification the loop members can be loosely or slidably connected to the selvage strand. This latter structure is less preferred.

FIG. 9 illustrates a length of connected strands which can be wound up in a roll so that the containers having the appropriate dimensions can be selected and cut from the roll. A series of strand loop members 30 having upper loop portions 31 are made from a single continuous strand which is secured at 34 to a flexible selvage strand member 32. Depending on the size of the container desired, the measured length of selvage strand is cut together with the loop strands. The ends of the selvage strand are then connected to one another so that a generally circular base is formed. Then a cover or liner is inserted within the frame thus formed.

A second series of loops 36 with loop portions 33 has been added as seen in FIG. 9 to increase the vertical dimensions of the frame. Loop portions 33 and 31 are twisted together at 38 for about three inches in length. When a portion of the roll is severed, the connection 38 is cut approximately midway of its length leaving a "pigtail" that can be connected to another "pigtail" in the same manner as the selvage strand 32. In the frame roll shown in FIG. 9, the loop members 30 are preferably arranged substantially normal to the selvage strand 32, approximately one loop member for every four inches of selvage strand length. Also, the loop portions of the loop members are generally rounded so as to be distortable.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:
1. A container for transporting a plant having a root system in a ball of earth, comprising a strand frame having a lower, generally centrally located selvage strand base member formed in a substantially circular configuration, said selvage base member being generally horizontally disposed, a plurality of radial loop strand members having their lowermost ends radially connected to said selvage base member, a flexible cover overlying said selvage base member and said loop members for receiving said ball of earth, said loop members being flexible and distortable whereby said loop portions are connectable to one another about the stem of a plant by means of a tie so that the selvage base member and loop members tightly embrace said cover and said ball of earth.

2. The invention of claim 1, wherein said loop members are formed of a continuous strand of flexible material.

3. The invention of claim 1, wherein the container is bowl-shaped and the selvage base member and the loop members are affixed to the flexible cover which forms the inner lining of said container.

4. The invention of claim 1, wherein a loop member is attached to said selvage base member approximately every four inches whereby for every loop member included in said container the vertical dimensions of the container is increased about one inch.

5. The invention of claim 1, wherein the loop portions of the loop members are interconnected with additional loop portions of further loop members and the vertical dimensions of said container are increased.

References Cited by the Examiner

UNITED STATES PATENTS

| | | | |
|---|---|---|---|
| 548,614 | 10/1895 | Lassen | 220—19 X |
| 2,022,607 | 11/1935 | Sorensen | 47—37 |
| 2,573,770 | 11/1951 | Meadow | 220—19 X |
| 3,161,989 | 12/1964 | Sigler et al. | 47—37 |

ABRAHAM G. STONE, *Primary Examiner.*

ROBERT E. BAGWILL, *Examiner.*